United States Patent
Isaksson

(10) Patent No.: US 9,743,398 B2
(45) Date of Patent: Aug. 22, 2017

(54) COMPUTER-IMPLEMENTED METHOD AND SYSTEM FOR AUTOMATIC GENERATION OF TIME SLOT ALLOCATION FOR A WIRELESS CONTROL LOOP

(75) Inventor: Alf Isaksson, Vasteras (SE)

(73) Assignee: ABB Research Ltd., Zurich (CH)

( * ) Notice: Subject to any disclaimer, the term of this patent is extended or adjusted under 35 U.S.C. 154(b) by 866 days.

(21) Appl. No.: 13/300,056

(22) Filed: Nov. 18, 2011

(65) Prior Publication Data

US 2012/0127971 A1 May 24, 2012

Related U.S. Application Data

(63) Continuation of application No. PCT/EP2009/056065, filed on May 19, 2009.

(51) Int. Cl.
*H04W 72/12* (2009.01)
*H04W 72/04* (2009.01)

(52) U.S. Cl.
CPC ........ *H04W 72/0446* (2013.01); *H04W 72/12* (2013.01)

(58) Field of Classification Search
USPC ................ 370/351, 357, 360, 369, 336–337
See application file for complete search history.

(56) References Cited

U.S. PATENT DOCUMENTS

| | | | | |
|---|---|---|---|---|
| 6,958,986 | B2* | 10/2005 | Cain | 370/337 |
| 7,460,865 | B2* | 12/2008 | Nixon et al. | 455/428 |
| 2003/0193919 | A1* | 10/2003 | Cain | H04B 7/0491 370/337 |
| 2004/0029579 | A1* | 2/2004 | Kashiwase | H04W 88/10 455/424 |
| 2007/0104214 | A1* | 5/2007 | Hsieh | H04L 12/2602 370/458 |
| 2008/0273486 | A1* | 11/2008 | Pratt et al. | 370/328 |
| 2008/0279155 | A1* | 11/2008 | Pratt, Jr. | H04L 12/66 370/336 |
| 2009/0010205 | A1* | 1/2009 | Pratt et al. | 370/328 |
| 2009/0010233 | A1* | 1/2009 | Pratt et al. | 370/338 |

(Continued)

OTHER PUBLICATIONS

Sivanthi, et al.; "An Application of Formal Approach for Distribution of Real-Time Control"; Intelligent Solutions in Embedded Systems; May 20, 2005; pp. 103-109.

(Continued)

*Primary Examiner* — Khaled Kassim
*Assistant Examiner* — Berhanu Belete
(74) *Attorney, Agent, or Firm* — Whitmyer IP Group LLC

(57) ABSTRACT

A computer implemented method for providing a time slot allocation in a wireless communication schedule for monitoring and control of a control loop in an industrial process, the industrial process having at least one control task and a plurality of wirelessly enabled field devices. The method includes importing dependency information between at least two field devices of at least one control loop, automatically converting the dependency information into a communication schedule and allocating time slots in the communication schedule to one or more field devices of the at least one control loop dependent at least on a dependency relationship between at least two field devices. A system and a computer program product are also disclosed.

24 Claims, 8 Drawing Sheets

(56) References Cited

U.S. PATENT DOCUMENTS

| | | | |
|---|---|---|---|
| 2009/0028114 A1* | 1/2009 | Proctor, Jr. | H04W 72/1263 370/336 |
| 2009/0034491 A1* | 2/2009 | Adams | H04W 72/1226 370/337 |
| 2009/0046675 A1* | 2/2009 | Pratt, Jr. | H04W 84/18 370/337 |
| 2009/0052429 A1* | 2/2009 | Pratt et al. | 370/350 |
| 2009/0059814 A1* | 3/2009 | Nixon et al. | 370/254 |
| 2009/0232105 A1* | 9/2009 | Kesselman | H01Q 3/26 370/336 |

OTHER PUBLICATIONS

Elmenreich, et al.; "Automatic Generation of Schedules for Time-Triggered Embedded Transducer Networks"; Sep. 19, 2005; pp. 535-541.

International Preliminary Report on Patentability; Application No. PCT/EP2009/056065; Issued:Jun. 9, 2011; 11 pages.

International Search Report and Written Opinion of the International Searching Authority; Application No. PCT/EP2009/056065; Issued: Jan. 25, 2010; Mailing Date: Feb. 8, 2010; 9 pages.

Tmar, et al.; "RTDT: A Static QoS Manager, RT Scheduling, HW/SW Partitioning CAD Tool"; Microelectronics Journal, Mackintosh Publications Journal; Nov. 1, 2006; pp. 1208-1209.

Written Opinion of the International Preliminary Examining Authority; Application No. PCT/EP2009/056065; Mailing Date: Apr. 21, 2011; 6 pages.

* cited by examiner

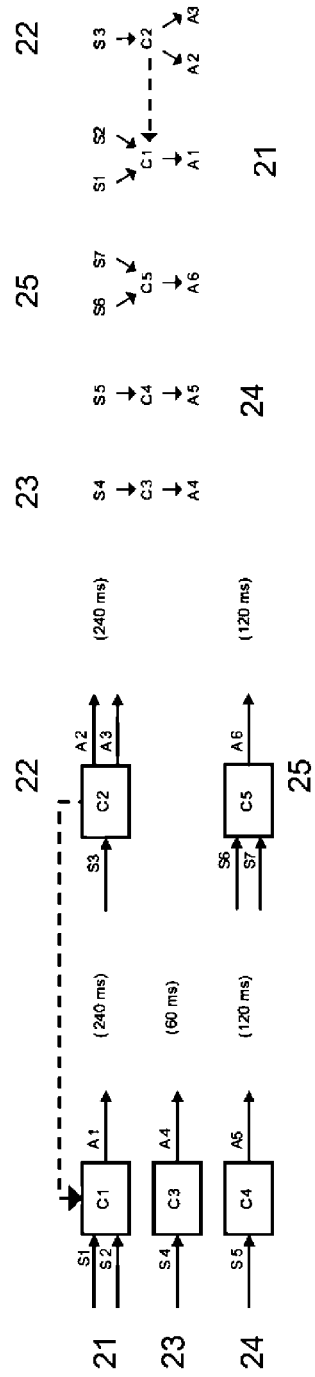
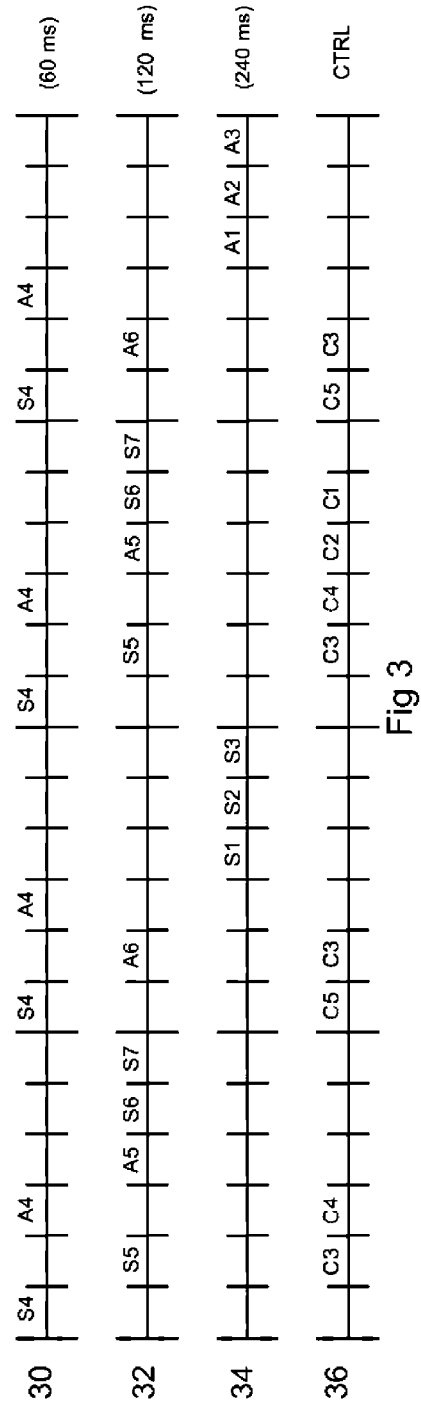
Fig 1
Fig 2
Fig 3

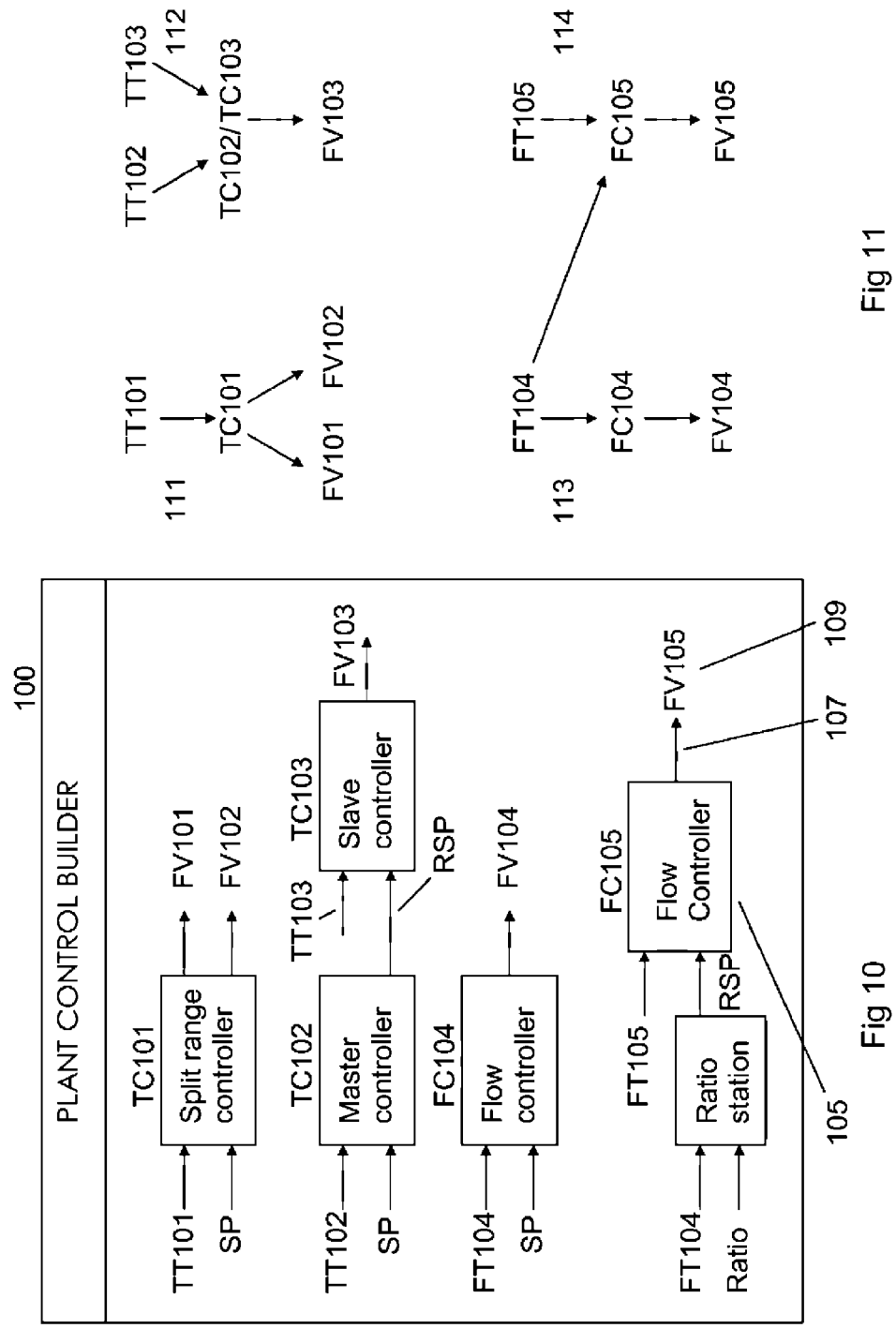

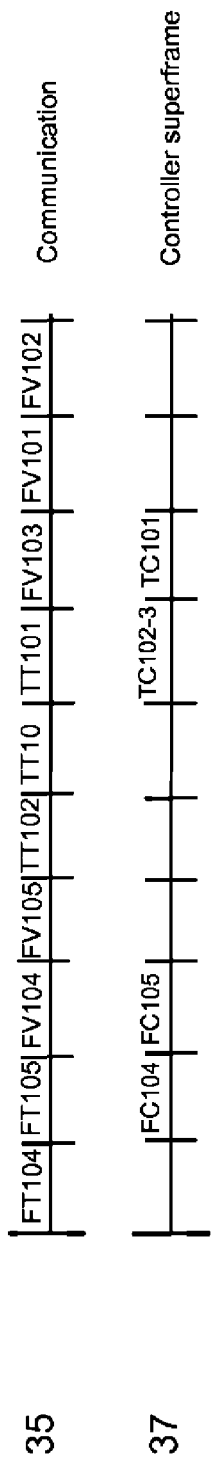

COMPUTER-IMPLEMENTED METHOD AND SYSTEM FOR AUTOMATIC GENERATION OF TIME SLOT ALLOCATION FOR A WIRELESS CONTROL LOOP

CROSS-REFERENCE TO RELATED APPLICATIONS

The present application is a continuation of pending International patent application PCT/EP2009/056065 filed on May 19, 2009 which designates the United States and the content of which is incorporated herein by reference.

FIELD OF THE INVENTION

The present invention is concerned with wireless communication in an industrial automation context. In particular it is concerned with a method and system for automatic generation of time slot allocation in one or more wirelessly enabled control loops which are monitored and/or controlled by a process control system.

BACKGROUND OF THE INVENTION

Process control for industrial automation processes or industrial automation devices is often supervised and regulated by a process control system as a number of control loops including one or more closed loop control processes. A traditional approach in the use of closed loop control is to measure a value of a process output and compare the measured value with a reference value. There are also other objectives of control loop control, including set-point regulation, tracking (time-varying reference path), path following (varying reference independent of time), disturbance attenuation etc. The most common form of control is a Proportional, Integral, Derivative (PID) control for feedback control. In PID control a sensor measurement is used as an input for a feedback control loop, and any difference between the measured sensor value and a reference (set-point) value or signal is determined by a controller. The controller then in turn sends signals to an actuator connected to the control loop in question, making changes to the process, so that the sensed value approaches the reference value over time.

The traditional closed loop feedback system comprises hard-wired communication links. A disadvantage with hard-wired communication links is that changes in position of any component or field device in the closed loop, such as a sensor or actuator, usually requires a stop in production or an extensive shutdown, especially in the case of analogue wired connections, and/or digital wired connections. Alternatively, such changes have to be delayed until a process shutdown may be programmed. In addition, hard wiring may be both expensive to replace and sometimes also technically challenging to replace.

Wireless technologies give several advantages to industrial automation in terms of gain in productivity and flexibility. Industrial sites are often harsh environments with stringent requirements on the type and quality of cabling. Moreover large sites often require many thousands of cables and it could be difficult to install or engineer additional wires in an already congested site. Thus wireless communication can save costs and time during an installation phase. At the same time wireless communication can improve reliability with respect to wired solutions by offering several mechanisms of diversity, such as space diversity, frequency diversity and time diversity. Furthermore the ad-hoc nature of wireless networks allows for easy setup and re-configuration when the network grows in size. However, when the field devices such as sensors and/or actuators are part of a closed-loop control system, an industrial application will require hard limits on the maximum delay allowed during the communication, so strict timing requirements have to be applied and consistently achieved.

Another requirement is the coexistence of the network with other equipment and competing wireless systems. The WirelessHART standard has been developed to fulfill these demands. WirelessHART is a wireless mesh network communication protocol for process automation applications, including process measurement, control, and asset management applications. It is based on the HART protocol, but it adds wireless capabilities to it enabling users to gain the benefits of wireless technology while maintaining compatibility with existing HART devices, tools and commands. A WirelessHART network may be connected to the plant automation network through a gateway. The plant automation network could be a TCP-based network, a remote I/O system, or a bus such as PROFIBUS. All network devices such as field devices and access points transmit and receive WirelessHART packets and perform the basic functions necessary to support network formation and maintenance.

Devices can be deployed in a star topology, that is where all devices are one hop to the gateway, to support a high performance application, or in a multi-hop mesh topology for a less demanding application, or any topology in between. These possibilities give flexibility to WirelessHART technology enabling various applications (both high and low performance) to operate in the same network. WirelessHART specifies the use of IEEE STD 802.15.4-2006 compatible transceivers operating in the 2.4 GHz ISM (Industrial, Scientific, and Medical) radio band. Communications among network devices are arbitrated using TDMA (Time Division Multiple Access) that allows scheduling of the communication link activity.

WirelessHART uses TDMA and channel hopping to control access to the network and to coordinate communications between network devices. The basic unit of measure is a time slot which is a unit of fixed time duration commonly shared by all network devices in a network. The duration of a time slot is sufficient to send or receive one packet per channel and an accompanying acknowledgement, including guard-band times for network wide-synchronization. The WirelessHART standard specifies that the duration of the time slot is 10 ms. The TDMA Data Link Layer establishes links specifying the time slot and frequency where 1.3. WirelessHART Standard communication between devices occurs. These links are organized into superframes that periodically repeat to support cyclic and acyclic communication traffic.

WirelessHART standard does not specify a particular scheduling algorithm to be used for scheduling communication in a WirelessHART network. However, for all network devices accessed through a WirelessHART gateway, the user has to configure how often each measurement value is to be communicated to the gateway. In order to support multiple superframes for the transfer of process measurements at different rates, the size of superframes should follow a harmonic chain in the sense that all periods should divide into each other, in particular, scan rates should be configured as integer multiples of the fastest update time that will be supported by network devices. The correctness of the process control system behavior depends not only on the logical results of the computations performed in each controller, but also on the physical instant at which these results are produced, in other words, it is a system with explicit deterministic (or probabilistic) timing requirements.

Thus the task of making up a schedule for communication links in a control loop may be subject to many conditions and constraints. In addition, in a typical process installation, communication scheduling and formation of superframes may be required for many hundreds or even thousands of control loops. This is a time consuming process for an installer or engineer, and one that also presents opportunities for errors to be made when an installer manually constructs a time schedule or configures a superframe for a control loop based on information for a control diagram or P&I diagram (Piping and Instrumentation). U.S. Pat. No. 7,460,865 entitled Self-configuring communication networks for use with process control systems, assigned to Fisher-Rosemount Systems, Inc., discloses methods for automatically assigning a first and a second wireless link to a first field device, wherein the first wireless link wirelessly couples the first field device to a second field device and wherein the second wireless link wirelessly couples the second wireless field device to a controller; the assignment being dependent on at least one first predetermined signal criterion.

SUMMARY OF THE INVENTION

The aim of the present invention is to remedy one or more of the above mentioned problems. This and other aims are obtained by a method for providing a time slot allocation in a wireless communication schedule for monitoring and control of a control loop in an industrial process.

In a first aspect of the invention a method is disclosed for providing a time slot allocation in a wireless communication schedule for monitoring and control of a control loop in an industrial process, said industrial process having at least one controller and a plurality of wirelessly enabled field devices wherein the method comprises importing dependency information between at least two said field devices of at least one said control loop, and allocating time slots in said communication schedule to one or more said field devices of the at least one said control loop dependent at least on a dependency relationship between at least two said field devices.

According to an embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises importing dependency information between at least two said field devices of at least one said control loop, and allocating time slots in a said wireless communication schedule arranged to one or more said field devices in two or more said control loops.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises allocating time slots in a said wireless communication schedule arranged as a superframe to one or more said field devices in at least one said control loop where the superframe comprises both a said wireless communication schedule and a control task execution schedule of a controller.

According to an embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises allocating time slots in two or more said wireless communication schedules arranged as multiple superframes to one or more said field devices in two or more said control loops.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises sending from a wireless gateway in the wireless network a time stamp or clock signal to a controller of a said control loop and synchronizing the execution of a control cycles of the controller to the time slots of said wireless communication.

According to an embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises allocating time slots in one or more TDMA schemas for a spread-spectrum wireless network operating as a mesh network and using frequency hopping to allocate channels.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises allocating time slots in one or more TDMA schemas for a wireless network compatible with WirelessHART or by allocating time slots in one or more TDMA schemas for a wireless network compatible with an ISA 100 standard.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises converting the dependency information for said field devices of at least one said control loop into a graph of dependency relationships.

In another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises allocating time slots for field devices in the one or more control loops in one of a plurality of superframes, which allocation is dependent at least on the information of dependency between two or more field devices and/or two or more control loops.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises storing one or more TDMA schemas or superframes in a wireless gateway or wireless node configured securely connected to a Network Manager application or device.

According to another embodiment of the invention a method is disclosed for providing a time slot allocation in a wireless communication schedule for monitoring and control of a control loop in an industrial process, said industrial process having at least one controller and a plurality of wirelessly enabled field devices wherein the method comprises importing dependency information on dependency between each said field device of one or more control loops from any of: a CAD file, a P&I diagram in any form, a process logic diagram in electronic file form, a P&I diagram in the form of an extended XML file, one or more operator process graphics, a controller configuration in a control system.

It is advantageous, when scheduling network communication for wireless control using an industrial wireless standard such as the recently released WirelessHART standard HART 7 Specifications, to schedule the sensor and actuator communication for individual controller tasks together, in one configuration step. To be able to do this it is necessary to have a description of which sensors and actuators that belong to the same task. This dependency may be represented as an acyclic directed graph. In this disclosure it is described how this dependency graph may be generated automatically based on either a CAD process and instrumentation diagram (P&I D) or based on a controller configuration in or created in a Distributed Control System (DCS).

For a realistic process control example with hundreds of control loops it may, however, be both time consuming but more importantly error prone to schedule the sensor and actuator communication for individual controller tasks together in a manual operation. The proposal of this disclosure is to automatically generate the dependency graph. This may be done either from a P&I diagram if electronically available, or from a configuration or a process graphic existing in the DCS.

A first advantage of creating dependency charts automatically direct from a P&I diagram or other existing process control schema is that manual errors are eliminated from the process. A second advantage is that, although automatic dependency chart conversion may consume more set-up time, in a more realistic example where there will be hundreds of control loops requiring a schedule for the communication, in a superframe, a considerable amount of time is saved because less time is required per control loop to automatically convert and create a dependency chart.

In another aspect of the present invention a wireless communication system for monitoring and control of a control loop of an industrial process is disclosed, said industrial process having a controller and a plurality of wireless enabled field devices, said wireless communication system comprising a plurality of wireless nodes communicating according to a wireless communication schedule, wherein the wireless network is controlled by a wireless network manager dependent on time slots allocated in said communication schedule to one or more said field devices of at least one said control loop dependent at least on a dependency relationship between at least two said field devices.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein the wireless network is controlled by a wireless network manager dependent on time slots allocated in said communication schedule to one or more said field devices of at least one said control loop dependent at least on a dependency relationship between at least two said field devices.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein the wireless network manager controls the wireless network dependent on time slots allocated in said wireless communication schedule to one or more said field devices of at least one said control loop dependent at least on a dependency relationship between at least two said field devices.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein said wireless communication schedule is arranged as a superframe to one or more said field devices in at least one said control loop where the superframe comprises both a said wireless communication schedule and a control task execution schedule of a controller.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein at least one wireless gateway in the wireless network is arranged configurable for clock synchronization with a controller of the one or more said control loops.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein the network manager is arranged connected to the at least one wireless gateway (60) in the wireless network using a secure connection.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein the network manager is arranged incorporated in a wireless gateway in the wireless network.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein a handheld wireless configuration device is arranged to configure any of a network manager, gateway or wirelessly enabled field device.

In another embodiment of the invention a wireless communication system for monitoring and control of a control loop of an industrial process is described, said industrial process having at least one controller and a plurality of wireless enabled field devices, said wireless communication system comprising a plurality of wireless nodes communicating according to a wireless communication schedule, wherein one or more computer programs for carrying out one or more methods of the invention are stored on a memory storage device connected to the control system or DCS.

In another aspect of the present invention a portable apparatus is disclosed for configuring wireless devices for monitoring and control of a control loop of an industrial process.

A computer program, and a computer program recorded on a computer-readable medium is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein:

FIG. 1 shows a schematic diagram for a series of control loops showing in particular a dependency chart of a dependency relationship between two or more field devices in one or more control loops according to an embodiment of the invention according to FIG. 4;

FIG. 2 shows a schematic diagram of the embodiment of FIG. 1 and in particular for the series of control loops referred to in FIG. 4 wherein FIG. 2 shows update times or period times for each of the control loops, in a method according to an embodiment of the invention;

FIG. 3 shows a schematic diagram of a development of the embodiment of FIG. 4 and in particular shows a diagram for a superframe in which a series of times slots in a TDMA superframe are allocated to one or more wirelessly enabled field devices in a control loop in a method according to an embodiment of the invention;

FIG. 10 is a schematic diagram for the embodiment of FIG. 4 and in particular for an embodiment comprising a display of an application for configuring a process control system or DCS;

FIG. 11 shows a second schematic diagram of the embodiment of FIG. 4 or FIG. 7 which in particular shows dependency relationships between field devices of the control loops shown in FIG. 9; and FIG. 12 shows a schematic diagram for two superframes in which a series of timeslots in TDMA superframes are allocated to one or more wirelessly enabled field devices, as well as the control tasks, of control loops such as those of FIG. 9 part of a method according to the preferred embodiment of the invention of FIG. 4.

DETAILED DESCRIPTION OF THE INVENTION

Figure 4:
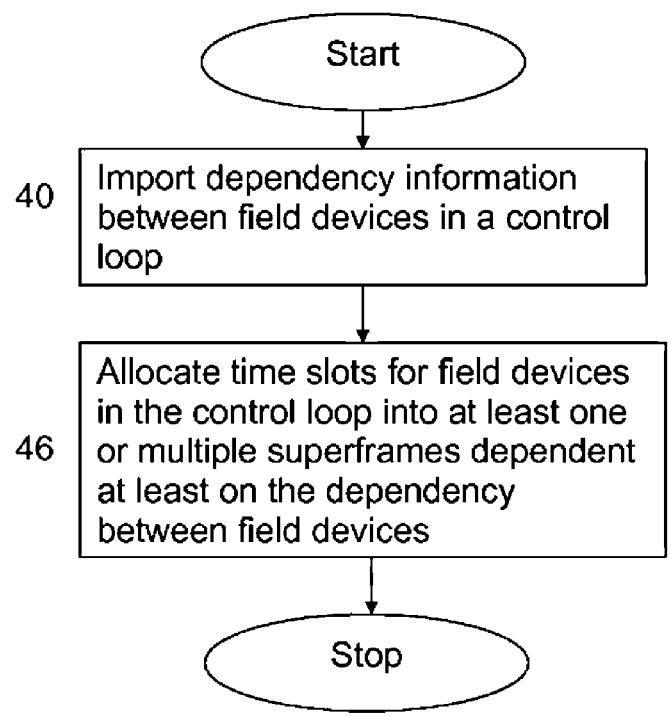
FIG. 4 shows a simplified flowchart for a development of one or more methods according to a preferred embodiment of the invention in which steps of a method for automatically generating a wireless communication time slot allocation schema for a control loop dependent on a dependency between field devices are shown.

In this disclosure it is described how a dependency graph for a control loop is generated automatically. The dependency graph is based on an existing process description contained, for example, in a CAD process and instrumentation diagram (P&I D) or based on a process logic configuration created in a Distributed Control System (DCS), or another schema detailing the process control logic for a process. The dependency graph is in turn used to allocate time slots in a TDMA (Time Division Multiple Access) schema in order to configure the wireless communication links of the control loop of a process.

An example is shown by means of FIGS. 1-3, where controllers are configured to execute control tasks jointly with wireless communication schedules for three different scan times in FIG. 3, corresponding to different superframes in a WirelessHART schedule. The corresponding dependency graph showing a dependency between one control loop and another is depicted in FIG. 1 and the superframes in FIG. 3. For a simple example of this size it is of course straightforward and fast to simply manually construct and/or enter the dependencies, and to allocate slots in the superframes. In more realistic examples containing more complex relationships, and more control loops, automatically constructing the dependency relationships and the superframes saves a great deal of time.

FIG. 1 shows five control loops 21-25. Each control loop includes wirelessly enabled field devices, for example sensors S1-S7 and actuators A1-A6. Each control loop includes one or more control tasks C1-C5 which are typically executed in a Programmable Logic Controller (PLC) or other industrial controller. Optionally two or more different control tasks may be carried out by the same controller. FIG. 1 shows a simple control loop 23 which has one input from a sensor S4, which is sent to a controller, where the control carries out a control task C3, and then sends an output signal to an actuator A4. A control loop may have more than one input and/or output. Control loop 21 is shown to have two inputs from two sensors S1 and S2. The control task C1 carried out by the controller then results in a single output to an actuator A1.

A dependency exists between some of the control loops in a typical process in the sense that one control task in a controller may require input from another control loop in order to complete a control task. Thus in FIG. 1, control loop 21 requires as an input a control output from the control task C2 of loop 22, as well as input from two sensors S1, S2, in order to complete its control task. The dependency between control loops may also be seen in FIG. 3. FIG. 3 shows a control task execution schedule 36. The schedule shows that a controller executes its control task C2 (including input from S3) before the controller executes its control task C1 (including output from the other controller C2).

FIG. 2 shows the period times or update rates for the five different control loops 21-25. The fastest control loop 23 has an update time, scan time, or period of 60 ms; the two slowest loops, the two loops with the greatest period 240 ms are loops 21, 22. Two other loops 24, 25 have a third value for the time period, 120 ms which lies in between the values 60 and 240 ms. The scan rates for each type of field device are known beforehand. The scan rates for each control loop are specified in the control logic, 60 ms, 120 ms etc., based on the known update rates for each field device in the control loop. That information on scan rates is available and specified, for example, in the control system configuration.

FIG. 3 shows three superframes 30, 32, 34, described here beginning at the top with the 60 ms scans or updates. As stated above, in WirelessHART in order to support multiple superframes for the transfer of process measurements at different rates, the size of superframes should follow a harmonic chain. This means that all periods should divide into each other, in particular, scan rates should be configured as integer multiples of the fastest update time that will be supported by network devices. Thus the 240 ms periods include multiples of 60 ms and 120 ms.

Thus in the first wireless communication schedule, superframe 30, there are four cycles each 60 ms apart. Note that there is a dependency between field devices in this control loop because sensor S4 shall send its signal to the controller before the controller carries out its control task C3 in a control cycle and then communicates its signal to actuator A4. One sensor input S4, cycles four times in the superframe as does one output to actuator A4. Similarly time slots may be allocated in the second superframe 32 to two control loops 24, 25 cycling at 120 ms. Three separate sensor inputs S5, S6, S7 cycle twice in the superframe; as do two actuator outputs A5, A6. (Note that in the example shown control loop 23 has two sensor inputs S6, S7.) The third superframe is for the slowest cycle in the group of control loops of interest, that is to say, the slowest period 240 ms in the wireless network of interest. This superframe includes one 240 ms cycle only for each of two control loops 21, 22. The superframe has time slots for one single input from each of sensors S1, S2, S3 and time slots for one single output from each of A1, A2, A3. Note that this superframe is arranged to comply with the dependency of control loop 21 on loop 22; ie that control loop 22 completes before the control task C1 of loop 21 may be carried out by a controller, leading to the single output to actuator A1 in this superframe.

FIG. 3 shows a controller task schedule 36 arranged in a superframe. Wireless communication schedules 30, 32, 34 may be executed jointly with the controller task schedule 36.

FIG. 4 shows a flowchart for method of automatically generating a wireless communication schedule based on dependency between two field devices in a control loop, which may be represented as a dependency chart or dependency graph. The figure shows:

40 Importing dependency information for the field devices in a selected one or more control loops, from a CAD file and/or a P&I diagram, and/or process control logic configured in a control system or control system tool, process logic arranged in one or more operator process graphics, or in another electronic schema;

46 Allocating time slots for field devices in the one or more control loops in at least one superframe dependent at least on the dependency information between two field devices (in this example the field devices are sensors or actuators) and optionally allocating time slots in a control task schedule 36 for a control task carried out in a controller dependent at least on the dependency information between two or more field devices and/or between two or more control loops.

Figure 6:
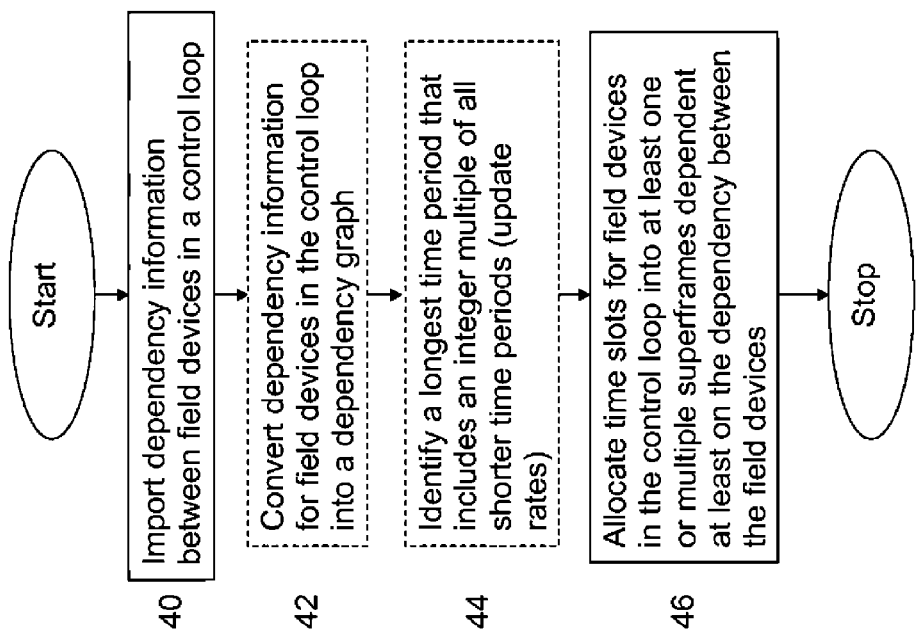
FIG. 6 shows a flowchart for another embodiment of the method of the preferred embodiment of FIG. 4, in which more particularly optional steps for automatically generating a wireless communication time slot allocation schema for a control loop dependent on a dependency between field devices are shown.
Figure 8:
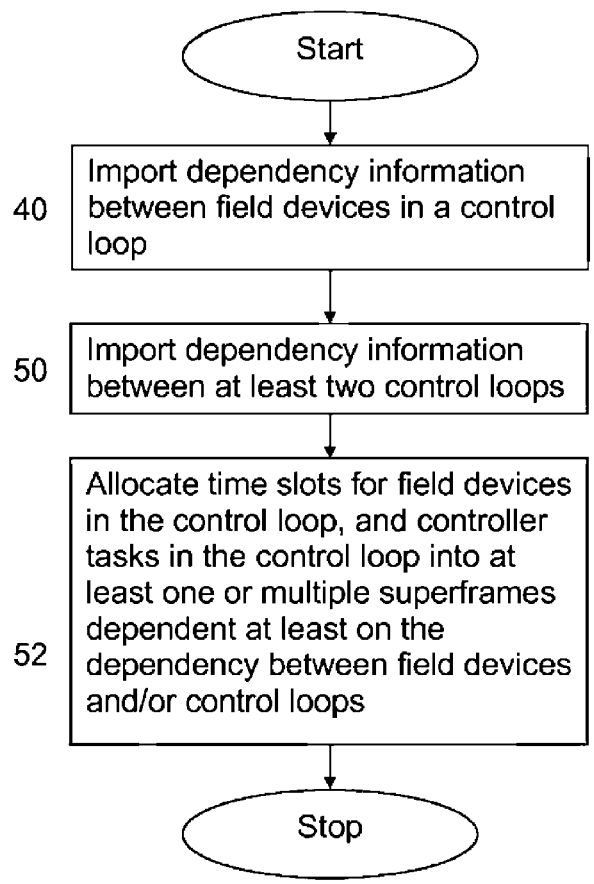
FIG. 8 is a flowchart for a development of the preferred embodiment of FIG. 4 or FIG. 7, in which more particularly one or more control task schedule time slots for controllers in a control loop dependent on a dependency between control loops are automatically generated as well as a plurality of wireless communication time slot allocations.

FIG. 6 shows a flowchart for an alternative method. The flowchart shows the steps of 40 Importing dependency information for the field devices in a selected one or more control loops, from a CAD file and/or a P&I diagram, and or process control logic configured in a control system or control system tool, process logic expressed in one or more operator process graphics, or in another electronic schema;

42 Optionally automatically or semi-manually converting the information on dependency between field devices into a dependency relationship such as a dependency graph;

44 Optionally identifying a longest time period that includes an integer multiple of all shorter time periods (scan rates or updates rates)

46 Allocating time slots for field devices in the one or more control loops in at least one superframe (30-34) dependent at least on the dependency information between two field devices (sensors or actuators) and optionally allocating time slots in a control task schedule (36) for a controller dependent at least on the dependency information between two field device and/or between two control loops.

Figure 7:
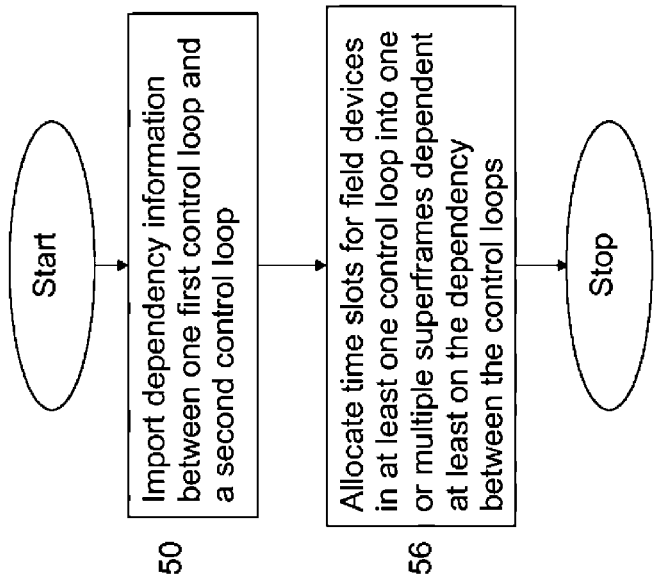
FIG. 7 shows a flowchart for a method according to the preferred embodiment of FIG. 4, in which steps of a method for automatically generating a wireless communication time slot allocation schema for a control loop dependent on a dependency between control loops are shown in a preferred embodiment of the invention.

FIG. 7 shows a flowchart for a method according to a preferred embodiment. The flowchart shows the steps of 50 Importing information for dependency between one first control loop and another second control loop, from a CAD file and/or a P&I diagram, and/or process control logic configured in a control system or control system tool, and/or a process graphic, or in another electronic schema;

56 Allocating time slots for field devices in at least one control loop in at least one superframe and/or control task schedule for a control task dependent at least on the dependency information and optionally allocating time slots in a control task schedule (36, 37) for a controller dependent at least on the dependency information between two field devices and/or between two control loops.

In addition to the 10 ms allocated time slots described above, standards such as the WirelessHART standard also permit that a time slot may be shared by two or more devices or nodes. Within the above standards there are methods to cope with data collisions in a time slot, so that shared time slots may be allocated. For example when data traffic is expected to be low a time slot may be shared, leaving collision avoidance mechanisms such as random time back-off to take care of conflicts occurring less often, for example during a configuration task or an optimising procedure at the installation or in the process. To take advantage of low traffic for certain communications in a network one or more time slots known to have low usage may be configured as shared time slots. This has the advantage of increasing the efficiency of bandwidth use. A random back-off time may be used, or an adaptive method that adapts to measured or estimated collisions occurring. A fixed back off time or a series of predetermined Wait times or Guarantee Time Slots (GTS) may also be used.

The dependency information is preferably imported into an application or function of the DCS. One optional source for dependency information is from a controller configuration in a control system, or such a configuration created in a DCS. A procedure to examine, edit or create a controller configuration may be run from any terminal connected to the DCS, such as an operator terminal, engineering terminal or workstation, a portable or handheld device or similar. Dependency information, whether in the form of a controller configuration or an imported P&I Diagram, CAD file or other format, is converted preferably automatically by the application or function of the DCS into one or more time slot allocation schemes or superframes. A copy of the one or more superframes thus created is preferably stored in the wireless gateway 60 of the wireless network in question where it is used by the Network Manager application or function to control wireless communication between the nodes 51-57, 60, 62, 64, 65 in the wireless network (see FIG. 5 below).

Figure 5:
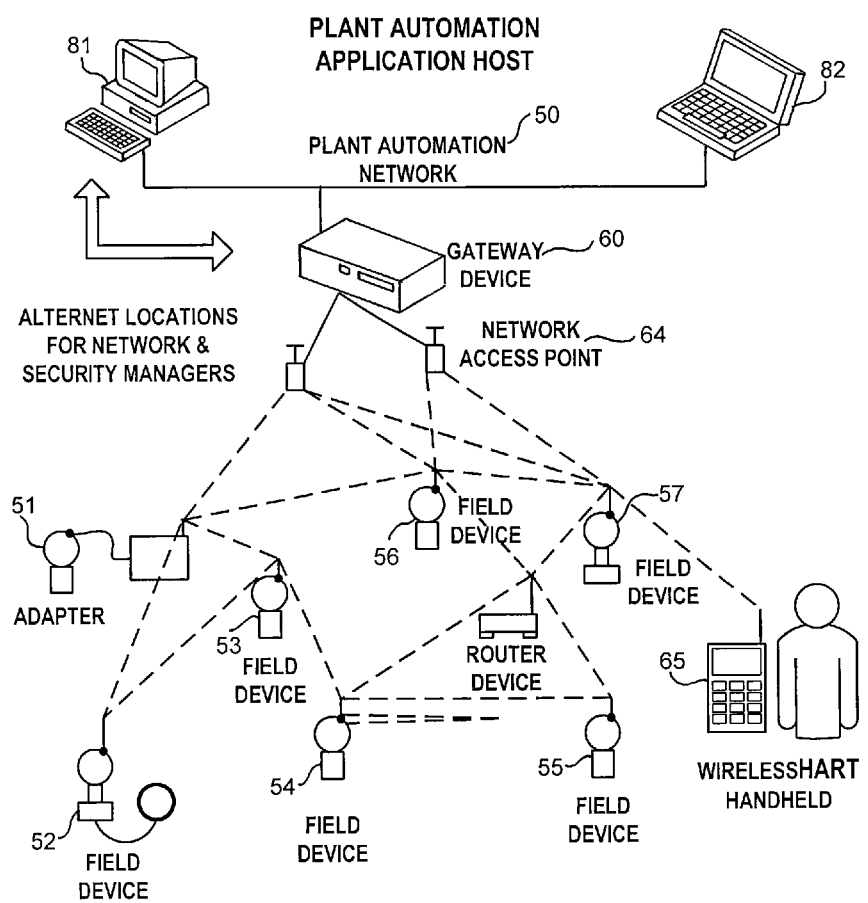
FIG. 5 (Prior Art) shows a schematic diagram of a process control system in an industrial installation including a series of control loops comprising one or more wirelessly enabled field devices.

FIG. 5 (Prior Art) shows a typical diagram for a wirelessHART network. The figure shows a number of wirelessly enabled field devices or nodes 51-57, a router 62, one or more network access points 64, a wireless gateway 60 and an industrial automation or Plant Automation network 50. The wireless gateway 60 is the gateway handling all wireless communication to/and or from the field devices to the process control system. A handheld device 65 is indicated, which is used for configuring, diagnosing and similar tasks in the network or in respect of a particular node.

A Network Manager application or device (not shown) is arranged either in the Gateway 60 or else directly connected by a secure connection to the Gateway. In this description securely connected means that the communication path between the wireless gateway and the network manager is a secure communication channel, typically a hard-wired connection. In a wireless network such as a WirelessHART network, the Network Manager unit or application is responsible for configuration of the network, scheduling communication between network devices, management of the routing tables and monitoring the health of the WirelessHART network.

Figure 9:
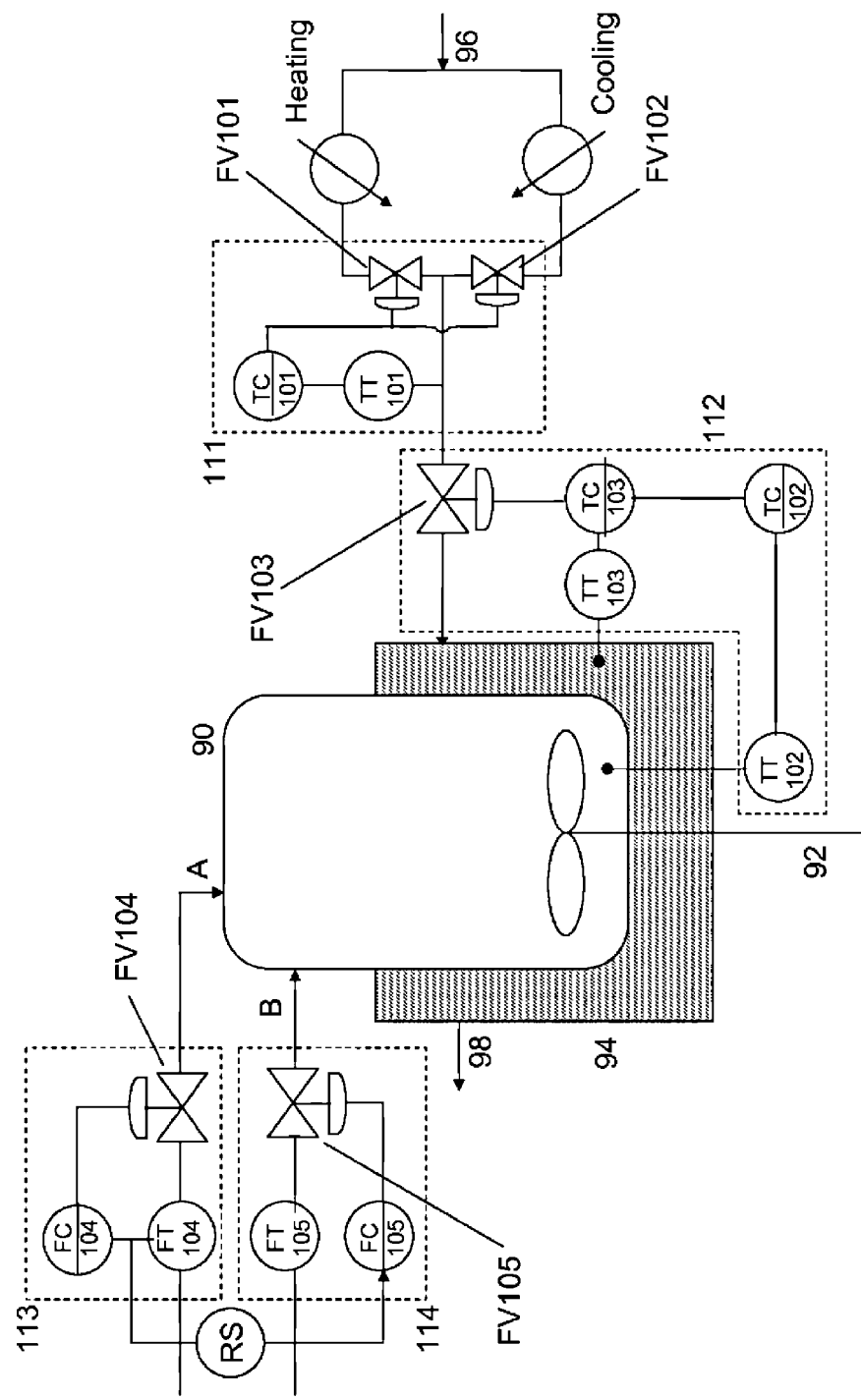
FIG. 9 shows a schematic process and instrumentation (P & I) diagram for an exemplary process comprising a reactor vessel from which control information may be extracted to describe one or more process control dependency relationships which may be automatically converted into a time slot allocation schema using an embodiment according to FIG. 4 or FIG. 7.

FIG. 9 shows a process and instrumentation (P & I) diagram for a chemical reactor vessel 90. The figure shows the reactor vessel with a stirrer 92 and a cooling jacket 94. The reactor vessel 90 is further arranged with an inlet for coolant 96 which is controlled by a flow control valve FV103. The temperature inside the reactor vessel is monitored by a sensor, temperature transmitter TT103 and the cooling jacket 94 is similarly arranged with a temperature sensor and monitored as temperature transmitter TT102. An outlet 98 is arranged to allow coolant to exit the cooling jacket. Furthermore the coolant temperature, measured by temperature transmitter TT101, is separately controlled using a heating valve FV101 and cooling valve FV102.

The inflow of component A to the reactor vessel is controlled by flow control valve FV104. In this exemplary embodiment, components A and B are to be introduced according to a ratio. A ratio station RS multiplies the flow of A, given by the flow transmitter FT104, with the desired ratio and then controls the flow of B (FT105) into the reactor via flow controller FC105 via flow control valve FV104.

This example illustrates 4 control loops 111-114, each indicated by a box shown with dashed lines, arranged around a stirred chemical reactor 94, and how communication and control tasks could be scheduled if both sensors and actuators are wirelessly connected to the controller. A P&I diagram for this example is shown in FIG. 9 and a list of all instruments and valves is given in Table 1 below.

TABLE 1

| Instrumentation and valve list. | |
|---|---|
| TT101 | Coolant temperature |
| TT102 | Reactor temperature |
| TT103 | Jacket temperature |
| FT104 | Feed flow component A |
| FT105 | Feed flow component B |
| FV101 | Heating valve |
| FV102 | Cooling valve |
| FV103 | Coolant flow valve |
| FV104 | Feed valve component A |
| FV105 | Feed valve component B |

As can be seen from the P&I diagram there are separate control loops 111 and 112 of the coolant temperature and the coolant flow. The temperature is controlled by a split range controller TC101 which opens the heating valve FV101 if coolant temperature is below setpoint and cooling valve FV102 when temperature is above setpoint.

The coolant flow is then used to control the temperature of the reactor using a cascade control structure. Here the reactor temperature is used in a master controller TC102 which provides setpoint to a slave controller TC103 controlling the jacket temperature, which in turn commands the valve opening FV103, in control loop 112. Although this structurally is depicted as two controllers, the execution of a cascade is usually performed as one calculation needing both process measurements as input. Hence in the scheduling these two controllers are jointly denoted as TC102-3.

Finally, it is here assumed that there are two main components fed into the reactor; components A and B, and that their flows need to be in a certain ratio to each other. Therefore there is only one independent flow loop 113 controlled by FC104, which setpoint indirectly determines the total feed flow. The flow of component B is then controlled by a ratio control structure. Similar to the cascade controller, execution of the ratio station RS and the flow controller FC105 are typically done as one joint control task (in the schedule denoted only as FC105).

Controller Configuration

Exactly how this set of 4 controllers (or 5 controllers if you count master and slave of the cascade separately) is configured in the control system may vary of course depending on the particular system used. However, if the configuration is done graphically using a graphic user interface and methods such as drag and drop it should typically look something like FIG. 10.

Scheduling

For the sake of this small example we assume that all control loops run using the same cycle time 100 ms. This is probably unnecessarily fast, but will serve the pedagogic purpose that it only allows a superframe of 10 slots for a WirelessHART schedule (since slots are 10 ms long), which incidentally is exactly the number we need for a single-hop schedule.

Assuming that a control task can be completed within one time slot, an example of optimized communication and control superframes, yielding a minimum of latency between sensing and actuating, is shown in FIG. 12.

Preferably the dependency graph is generated automatically based on either a CAD process and instrumentation (P&I) diagram or based on a controller configuration in a control system or a Distributed Control System (DCS). Alternatively the time slots may be calculated or otherwise determined directly from the dependency information without an intermediate step of constructing a dependency chart or dependency diagram as such.

FIG. 10 represents a simplified screen display for an application 100 for configuring a process control system or DCS. The figure shows five control task objects which are labelled TC101, TC102, TC103, FC104, FC105. These objects have been arranged to configure the process control for the reactor shown in FIG. 9. Thus the control object 105 representing flow controller FC105 has inputs 103, which for this control object 105, are a flow transmitter FT105 (flow of component B), a second flow transmitter FT104 (flow of component A) and a Ratio station with a predetermined setting Ratio representing a desired ratio for B:A. Control task object 105 has in this case one output 107 to an actuator which is flow control valve FC105, controlling the inflow of B into the reactor. The other four control task objects are similarly configured with inputs and outputs to represent the process flow and control diagrammed in FIG. 9.

FIG. 11 shows a dependency chart for the process shown in the FIG. 9. The dependency chart shows 4 control loops 111-114. The dependency chart shows, for example, the control loop 112 controlling flow control valve FV103 controlling coolant flow into the reactor as follows. Inputs of temperature from sensors TT102 (reactor temp) and TT103 (cooling jacket temp) are input to a controller. In this case the controller is indicated as TC102-3 because these master/slave control tasks are typically executed together as one joint CPU task. The controller output goes to the actuator flow control valve FV103 to adjust the coolant flow into the cooling jacket. The dependency chart may be produced automatically by converting the P&I diagram of FIG. 9, or the process controller configuration in a control system or a Distributed Control System (DCS) as illustrated in FIG. 10. Alternatively or as well a dependency relationship between objects in a control loop may be extracted from process graphics, in particular from operator process graphics. The dependency chart may be used to automatically generate one or more superframes or communication time slot allocations, in the same way as the communication time slot allocations 30, 32, 34 and the control time slot allocation 36 of FIG. 3.

Alternatively the time slot allocations may be automatically produced directly from a P&I diagram such as FIG. 9, or a control application configuration schema such as FIG. 10, without actually producing a dependency chart output of the type shown in FIG. 11.

FIG. 12 shows a frame with communication time slot allocation for the control loops 111-114 of the process of FIG. 9. Each control loop includes wirelessly enabled field devices, for example sensors TT101-TT103 and FT104-105 of FIG. 9, and actuators representing actuator valves FV101-FV105. It should be noted that one or more field devices of a control loop, for example one or more actuators, may have a wired connection to a controller and not a wireless connection. In any case, each control loop includes a control task representing controllers TC101-TC103, FC105-FC105, which are typically executed in one or more Programmable Logic Controllers (PLC) or other industrial controller. More than one control task may be executed in a single controller. The communication superframe 35 includes sensor cycles TT101-103, FT104-105 and actuator (FV101-FV105) cycles each of 100 msec. The controller time slot allocation or controller superframe 37 shows one time slot allocation per superframe for each of the control tasks TC101, TC102-3, FC104-105, assuming that they will all be executed in the same controller CPU.

In an advantageous application of the invention, time synchronisation in the wirelessly enabled control loops is synchronised with a clock signal from the clock in an industrial controller based on a signal from the wireless gateway to the controller. This ensures that the control cycle of one or more controllers is synchronised with the one or more TDMA-based superframes with communication time slots for field devices when sending and/or receiving is accurate and maintains quality of wireless service.

The invention has been described in relation to wireless networks compatible with the WirelessHART standards, but may with suitable adaptation be practised with other TDMA based networks compatible with an industrial standard such as that know as "Fieldbus", and is specifically referred to as SP50, which is as acronym for Standards and Practice Subcommittee 50, or to ISA 100 standard.

The microprocessor (or processors) of a wireless controller carrying out a control task such as Flow control 105, master control TC102 or Slave control TC103 comprises a central processing unit CPU performing the steps of the method according to an aspect of the invention. For example carrying out one or more control tasks C1-C5. These steps are performed with the aid of one or more computer programs, which are stored at least in part in memory accessible by the processor. It is to be understood that the computer programs may also be run on one or more general purpose industrial microprocessors or computers instead of a specially adapted computer.

The computer program comprises computer program code elements or software code portions that make the computer perform the method using equations, algorithms, data and calculations previously described, for example in relation to FIGS. 4, 6-8. A part of the program may be stored in a processor as above, but also in a ROM, RAM, PROM or EPROM chip or similar memory storage device. The program in part or in whole may also be stored on, or in, other suitable computer readable medium such as a magnetic disk, CD-ROM or DVD disk, hard disk, magneto-optical memory storage means, in volatile memory, in flash memory, as firmware, or stored on a data server. Removable memory media such as a USB memory stick, flash drive, or similar.

It should be noted that while the above describes exemplifying embodiments of the invention, there are several variations and modifications which may be made to the disclosed solution without departing from the scope of the present invention as defined in the appended claims.

What is claimed is:

1. A computer implemented method for providing a time slot allocation in a wireless communication schedule for monitoring and control of a control loop in an industrial process, said industrial process having at least one control task and a plurality of wirelessly enabled field devices; characterized by importing dependency information between a plurality of said field devices of at least one control loop from any of a computer aided design file, a process and instrumentation diagram in electronic file form, a process logic diagram in electronic file form, a process and instrumentation diagram in the form of an extended extensible markup language file, a process graphic, a controller configuration in a control system, and allocating time slots in said communication schedule to at least one of said field devices of the at least one control loop dependent at least on a dependency information between the plurality of said field devices
wherein said dependency information indicates whether a control task requires as an input an output of one of said field devices or control loops.

2. The method according to claim 1, characterised by allocating time slots in a said wireless communication schedule arranged to one or more said field devices in two or more said control loops.

3. The method according to claim 1, characterised by allocating time slots in a said wireless communication schedule arranged as a superframe to one or more said field devices in at least one said control loop where the superframe comprises both a said wireless communication schedule and a control task execution schedule of a controller.

4. The method according to claim 1, characterised by allocating time slots in two or more said wireless communication schedules arranged as multiple superframes to one or more said field devices in two or more said control loops.

5. The method according to claim 1, characterised by sending from a wireless gateway in a wireless network a time stamp or clock signal to a controller of a said control loop and synchronizing the execution of a control cycles of the controller to the time slots of said wireless communication.

6. The method according to claim 1, characterised by allocating time slots in one or more time-division-multiple-access schemas for a spread-spectrum wireless network operating as a mesh network and using frequency hopping to allocate channels.

7. The method according to claim 1, characterised by allocating time slots in one or more time-division-multiple-access schemas for a wireless network compatible with WirelessHART.

8. The method according to claim 1, characterised by allocating time slots in one or more time-division-multiple-access schemas for a wireless network compatible with an ISA 100 standard.

9. The method according to claim 1, characterised by converting the dependency information between said field devices of at least one said control loop into one or more dependency relationships.

10. The method according to claim 1, characterised by converting dependency information between said field devices of at least one said control loop, the dependency information being comprised in a process logic diagram, into one or more dependency relationships and allocating time slots in said communication schedule to one or more said field devices dependent at least on the dependency relationship between at least two said field devices.

11. The method according to claim 1, characterised by allocating time slots for field devices in the one or more control loops in one of a plurality of superframes, which allocation is dependent at least on the information of dependency between two or more field devices and/or two or more control loops.

12. The method according to claim 1, characterised by storing one or more time-division-multiple-access schemas or superframes in a wireless gateway or wireless node configured securely connected to a Network Manager application or device.

13. The method according to claim 1, characterised by allocating at least one shared time slot for a field device in the one or more control loops in at least one of a plurality of superframes.

14. A wireless communication system for monitoring and control of a control loop of an industrial process, said industrial process having at least one control task and a plurality of wireless enabled field devices, said wireless communication system comprising a plurality of wireless nodes communicating according to a wireless communication schedule and forming part of a wireless network;
characterised in that the wireless network is controlled by a wireless network manager dependent on time slots allocated in said communication schedule to at least one of said field devices of at least one said control loop dependent at least on a dependency information between at least two said field devices, and a distributed control system having an application or function into which dependency information between the at least two said field devices of the at least one said control loop is arranged to be imported from any of a computer aided design file, a process and instrumentation diagram in electronic file form, a process logic diagram in electronic file form, a process and instrumentation diagram in the form of an extended extensible markup language file, a process graphic, a controller configuration in a control system;
wherein said dependency information indicates whether a control task requires as an input an output of one of said field devices or control loops.

15. The system according to claim 14, characterised in that the wireless network manager controls the wireless network dependent on time slots allocated in said wireless communication schedule to one or more said field devices of at least one said control loop dependent at least on a dependency information between at least two said field devices and two or more control loops.

16. The system according to claim 14, characterised in that the wireless network manager controls the wireless network dependent on time slots allocated in said wireless communication schedule to one or more said field devices of at least one said control loop dependent at least on a dependency information between two or more control loops.

17. The system according to claim 14, characterised in that said wireless communication schedule is arranged as a superframe to one or more said field devices in at least one said control loop where the superframe comprises both a said wireless communication schedule and a control task execution schedule of a controller.

18. The system according to claim 14, characterised in that at least one wireless gateway in the wireless network is arranged configurable for clock synchronization with a control task of the one or more said control loops.

19. The system according to claim 18, characterised in that the network manager is arranged connected to the at least one wireless gateway in the wireless network using a secure connection.

20. The system according to claim 14, characterised in that the network manager is arranged incorporated in a wireless gateway in the wireless network.

21. The system according to claim 14, characterised in that a handheld wireless configuration device is arranged to configure any of a network manager, gateway or wirelessly enabled field device.

22. The system according to claim 14, characterised by one or more field devices connected to said control loop of an industrial process by a hard-wired connection.

23. The system according to claim 14, characterised by a processing unit in a computer based system, the processing unit having an internal memory with a computer program product loaded therein, comprising software code portions for allocating time slots in said communication schedule to one or more said field devices of the at least one said control loop dependent at least on a dependency information between at least two said field devices stored on a memory storage device connected to the control system or DCS.

24. A computer program product on a non-transitory computer readable medium comprising computer program code configured to perform a method for providing a time slot allocation in a wireless communication schedule for monitoring and control of a control loop in an industrial process, said industrial process having at least one control task and a plurality of wirelessly enabled field devices;
   characterized by importing dependency information between a plurality of said field devices of at least one control loop from any of a computer aided design file, a process and instrumentation diagram in electronic file form, a process logic diagram in electronic file form, a process and instrumentation diagram in the form of an extended extensible markup language file, a process graphic, a controller configuration in a control system, and allocating time slots in said communication schedule to at least one of said field devices of the at least one control loop dependent at least on the dependency information between the plurality of said field devices, when said program code is loaded into a computer or terminal connected to a process control system;
   wherein said dependency information indicates whether a control task requires as an input an output of one of said field devices or control loops.

* * * * *